United States Patent
Yen et al.

(10) Patent No.: US 9,134,839 B2
(45) Date of Patent: Sep. 15, 2015

(54) ELECTRONIC DEVICE WITH TOUCH SCREEN AND METHOD FOR DETERMINING RELATIVE POSITION OF THE ELECTRONIC DEVICE WITH RESPECT TO ANOTHER ELECTRONIC DEVICE

(71) Applicant: Chi Mei Communication Systems, Inc., New Taipei (TW)

(72) Inventors: Yu-Hsuan Yen, New Taipei (TW); Ting-Wei Chang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 56 days.

(21) Appl. No.: 13/900,601

(22) Filed: May 23, 2013

(65) Prior Publication Data
US 2013/0321310 A1 Dec. 5, 2013

(30) Foreign Application Priority Data
May 30, 2012 (TW) ............................... 101119235 A

(51) Int. Cl.
G06F 3/14 (2006.01)
G06F 3/041 (2006.01)
G06F 3/0488 (2013.01)

(52) U.S. Cl.
CPC .......... *G06F 3/0412* (2013.01); *G06F 3/04883* (2013.01); *G06F 3/1423* (2013.01); *G09G 2340/0464* (2013.01)

(58) Field of Classification Search
CPC . G06F 3/1423; G06F 3/1446; G06F 3/04883; G09G 2340/0464
USPC ...................................... 345/1.3, 4
See application file for complete search history.

(56) References Cited

U.S. PATENT DOCUMENTS

| 7,573,462 | B2 * | 8/2009 | Ouchi | 345/157 |
|---|---|---|---|---|
| 7,636,794 | B2 * | 12/2009 | Ramos et al. | 709/248 |
| 8,736,583 | B2 * | 5/2014 | Anderson et al. | 345/175 |
| 8,751,970 | B2 * | 6/2014 | Hinckley et al. | 715/863 |
| 8,847,995 | B2 * | 9/2014 | Kimura | 345/660 |
| 2005/0093868 | A1 * | 5/2005 | Hinckley | 345/502 |
| 2011/0216064 | A1 * | 9/2011 | Dahl et al. | 345/428 |

OTHER PUBLICATIONS

Ken Hinckley, Gonzalo Ramos, Francois Guimbretiere, Patrick Baudisch, and Marc Smith. May 2004. Stitching: pen gestures that span multiple displays. In Proceedings of the working conference on Advanced visual interfaces (AVI '04). ACM, New York, NY, USA, 23-31. DOI=10.1145/989863.989866 http://doi.acm.org/10.1145/989863.989866.*
Brad Johanson, Greg Hutchins, Terry Winograd, and Maureen Stone, Oct. 2002 PointRight: experience with flexible input redirection in interactive workspaces. In Proceedings of the 15th annual ACM symposium on User interface software and technology (UIST '02). ACM, New York, NY, USA, 227-234.*

* cited by examiner

*Primary Examiner* — Larry Sternbane
(74) *Attorney, Agent, or Firm* — Novak Druce Connolly Bove + Quigg LLP

(57) ABSTRACT

In a method for determining a position of a first electronic device including a first touch screen relative to a second electronic device including a second touch screen, a communication connection between the first electronic device and the second electronic device is established. When a user slides an object from the first touch screen to the second touch screen, a departure touch point and a departure time that the object departs from the first touch screen, an arrival touch point and an arrival time that the object arrives at the second touch screen are obtained. If a difference between the departure time and the arrival time falls within a specified range, the position of the first electronic device is determined. The position of the first electronic device is stored into a storage system of the first electronic device.

12 Claims, 4 Drawing Sheets

ELECTRONIC DEVICE WITH TOUCH SCREEN AND METHOD FOR DETERMINING RELATIVE POSITION OF THE ELECTRONIC DEVICE WITH RESPECT TO ANOTHER ELECTRONIC DEVICE

BACKGROUND

1. Technical Field

The embodiments of the present disclosure relate to positioning systems and methods, and particularly to an electronic device and a method for determining a position of the electronic device relative to another electronic device.

2. Description of Related Art

Touch screens are widely used in electronic devices such as mobile phones. Some applications may be designed to function between two electronic devices that both include touch screens. For example, a user may combine touch screens of two electronic devices to emulate one large touch screen. However, before implementing such application, a position of one electronic device relative to the other electronic device is needed to be determined.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives.

Figure 1:
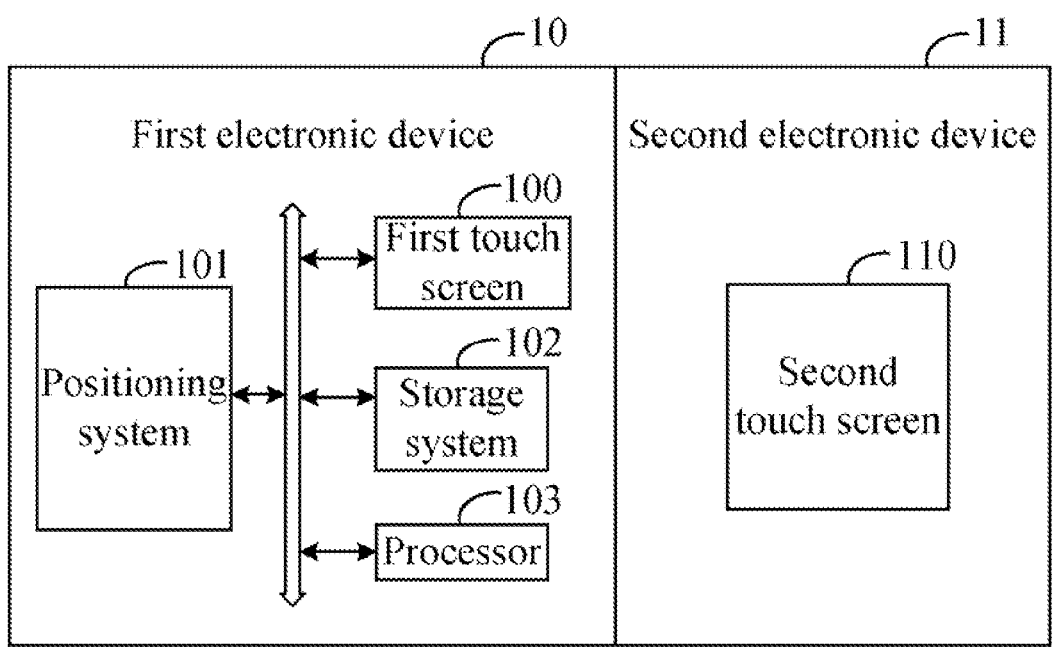
FIG. 1 is one embodiment of an application of a first electronic device.

FIG. 1 is one embodiment of an application of a first electronic device 10. The first electronic device 10 includes a first touch screen 100 and a positioning system 101. The first electronic device 10 is adjacent to a second electronic device 11, which includes a second touch screen 110. Each of the first touch screen 100 and the second touch screen 110 may be a resistive touch screen, a capacitive touch screen, or any other suitable type of touch screen. When a user slides an object (e.g., a finger or stylus) from the first touch screen 100 to the second touch screen 110, touch points are sensed by the first touch screen 100 and the second touch screen 110. The positioning system 101 determines a position of the first electronic device 10 relative to the second electronic device 11 according to the touch points.

The first electronic device 10 may further include a storage system 102 and at least one processor 103. The storage system 102 may be a dedicated memory, such as EPROM, a hard disk drive (HDD), or flash memory. In some embodiments, the storage system 102 may also be an external storage device, such as an external hard disk, a storage card, or other data storage medium.

Figure 2:
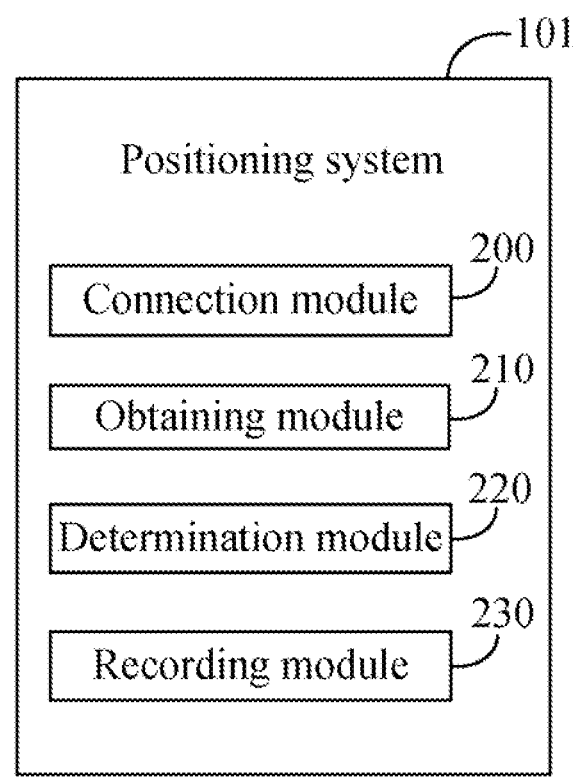
FIG. 2 is a block diagram of one embodiment of function modules of a positioning system of the first electronic device in FIG. 1.

FIG. 2 is a block diagram of one embodiment of function modules of the positioning system 101 shown in FIG. 1. The positioning system 101 includes a connection module 200, an obtaining module 210, a determination module 220, and a recording module 230. The modules 200-230 may comprise computerized code in the form of one or more programs that are stored in the storage system 102. The computerized code includes instructions that are executed by the at least one processor 103, to provide the aforementioned functions of the positioning system 101. A detailed description of the functions of the modules 200-230 is given below in reference to FIG. 3.

Figure 3:
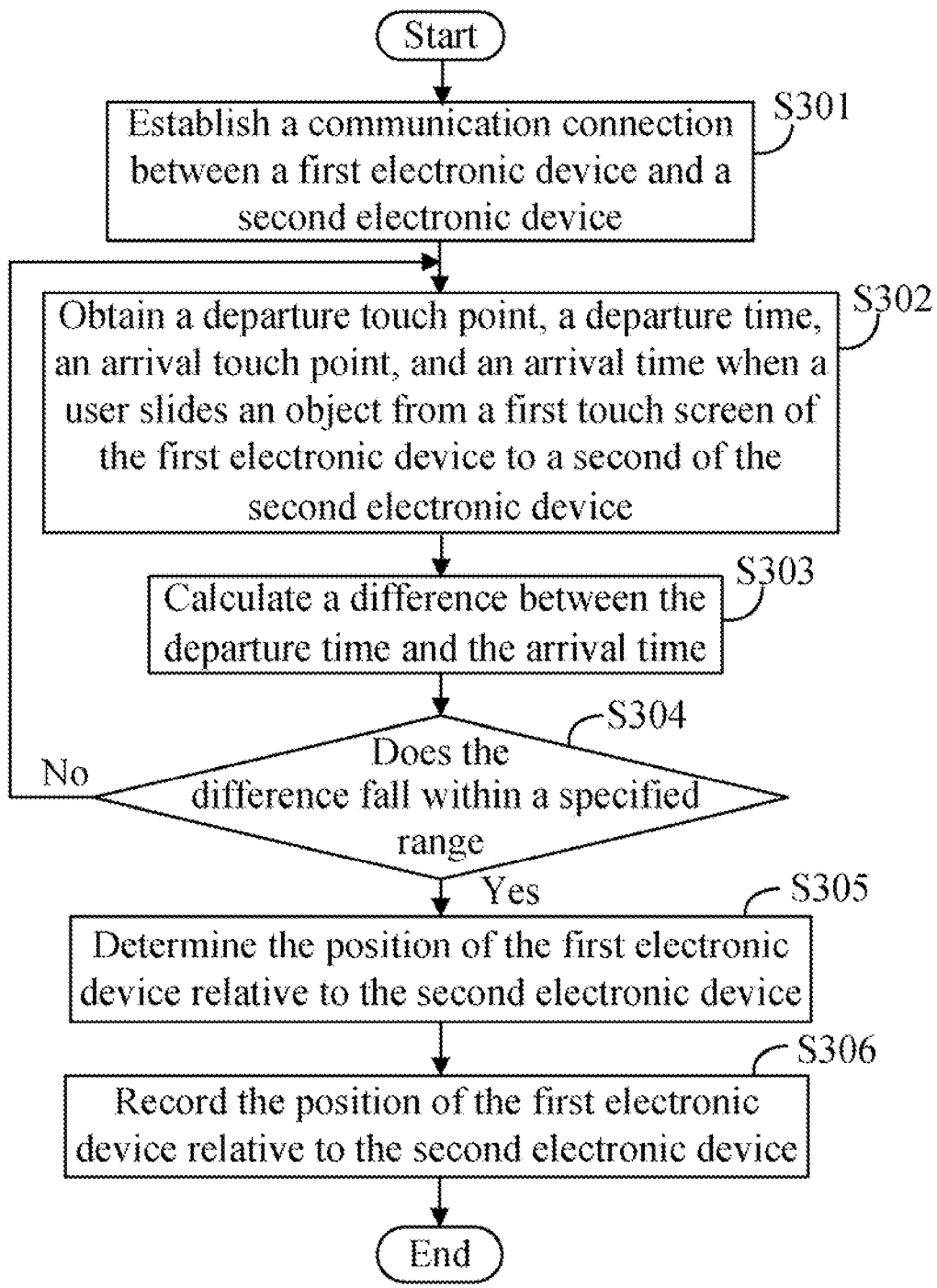
FIG. 3 is a flowchart of one embodiment of a method for determining a position of the first electronic device relative to a second electronic device using the first electronic device in FIG. 1.

FIG. 3 is a flowchart of one embodiment of a method for determining a position of the first electronic device 10 relative to the second electronic device 10 using the first electronic device 10 in FIG. 1. Depending on the embodiment, additional steps may be added, others removed, and the ordering of the steps may be changed.

In step S301, the connection module 200 establishes a communication connection between the first electronic device 10 and the second electronic device 11. In one example, the first electronic device 10 is connected to the second electronic device 11 via a wireless network.

Figure 4:
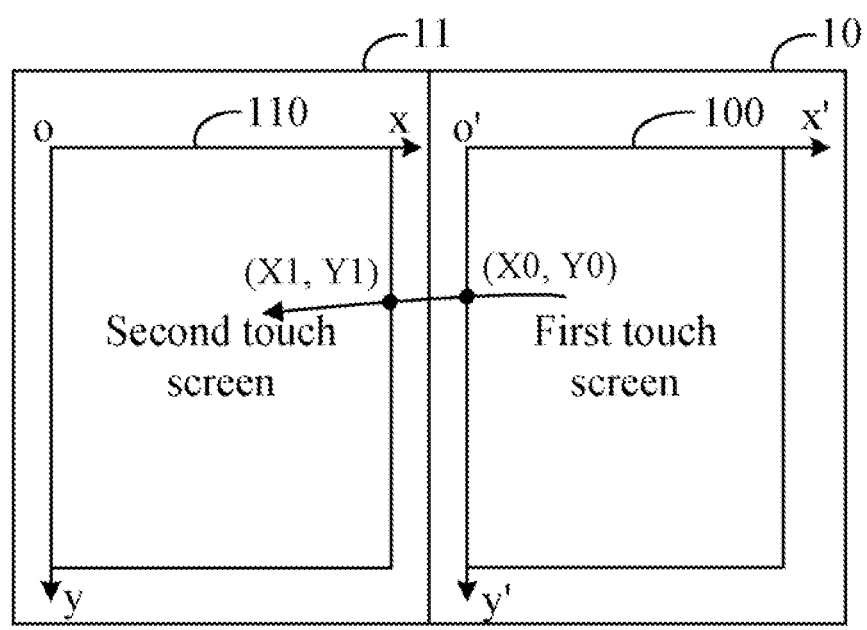
FIG. 4 is one embodiment illustrating a departure touch point and an arrival touch point.

In step S302, the obtaining module 210 prompts a user to slide an object (e.g., a finger or stylus) from the first touch screen 100 to the second touch screen 110, obtains a departure touch point and a departure time that the object departs from the first touch screen 100, and obtains an arrival touch point and an arrival time that the object arrives at the second touch screen 110. In one embodiment, each of the first touch screen 100 and the second touch screen 110 includes a plurality of touch sensors. When the user touches the first touch screen 100 or the second touch screen 110 using the object, each touch point is detected by the touch sensors. The arrival touch point and an arrival time that the object arrives at the second touch screen 110 may be detected by the second electronic device 11 and sent from the second electronic device 11 to the first electronic device 10. In one example with respect to FIG. 4, there is a coordinate system in each of the first electronic device 10 and the second electronic device 11. An origin of the coordinate system of the first electronic device 10 may be located at the top left corner of the first touch screen 100. An origin of the coordinate system of the second electronic device 11 may be located at the top left corner of the second touch screen 110. Coordinates of the departure touch point may be denoted as (X0, Y0). Coordinates of the arrival touch point may be denoted as (X1, Y1).

In step S303, the determination module 220 calculates a difference between the departure time and the arrival time. For example, the arrival time is 12:00:04 and the departure time is 12:00:02. The difference between the departure time and the arrival time is 2 seconds.

In step S304, the determination module 220 determines whether the difference between the departure time and the arrival time falls within a specified range (e.g., less than or equal to 1 second). If the difference between the departure time and the arrival time does not fall within the specified range, the process returns to step S302. If the difference between the departure time and the arrival time falls within the specified range, step S305 is implemented.

In step S305, the determination module 220 determines the position of the first electronic device 10 relative to the second electronic device 11 according to the departure touch point and the arrival touch point. In one example with respect to FIG. 4, the coordinates of the departure touch point are (X0, Y0), the coordinates of the arrival touch point are (X1, Y1). If X0 is equal to zero and X1 is equal to a width of the second touch screen 110, the first electronic device 10 is determined on the right of the second electronic device 11. If X0 is equal to a width of the first touch screen 100 and X1 is equal to zero, the first electronic device 10 is determined on the left of the second electronic device 11. If Y0 is equal to zero and Y1 is equal to a height of the second touch screen 110, the first electronic device 10 is determined below the second electronic device 11. If Y0 is equal to a height of the first touch screen 100 and Y1 is equal to zero, the first electronic device 10 is determined above the second electronic device 11.

In step S306, the recording module 230 records the position of the first electronic device 10 relative to the second electronic device 11 into the storage system 102. The recording module 230 may further send the position of the first electronic device 10 relative to the second electronic device 11 to the second electronic device 11. Based on the position of the first electronic device 10 relative to the second electronic device 11, various applications may be implemented between the first electronic device 10 and the second electronic device 11. For example, a user may combine the first touch screen 100 and the second touch screen 110 to emulate a large touch screen. Images can be displayed correctly on the combined touch screen only when the position of the first electronic device 10 relative to the second electronic device 11 is determined.

It may be understood that if the user slides the object from the second touch screen 110 to the first touch screen 100, a departure touch point and a departure time that the object departs from the second touch screen 110, and an arrival touch point and an arrival time that the object arrives at the first touch screen 110 can be obtained. Accordingly, the position of the first electronic device 10 relative to the second electronic device 11 can be determined.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method for determining a position of a first electronic device comprising a first touch screen relative to a second electronic device comprising a second touch screen being executed by a processor of the first electronic device, the method comprising:
   establishing a communication connection between the first electronic device and the second electronic device;
   prompting a user to slide an object from the first touch screen to the second touch screen, obtaining a departure touch point and a departure time that the object departs from the first touch screen, and obtaining an arrival touch point and an arrival time that the object arrives at the second touch screen;
   calculating a difference between the departure time and the arrival time, and determining the position of the first electronic device relative to the second electronic device according to the departure touch point and the arrival touch point in response that the difference between the departure time and the arrival time falls within a specified range, when coordinates of the departure touch point in a first coordinate system of the first electronic device are (X0, Y0), coordinates of the arrival touch point in a second coordinate system of the second electronic device are (X1, Y1), wherein an origin of the first coordinate system of the first electronic device is located at a top left corner of the first touch screen and an origin of the second coordinate system of the second electronic device is located at a top left corner of the second touch screen, the position of the first electronic device relative to the second electronic device is determined as follows:
   the first electronic device is determined to be on the right of the second electronic device if X0 is equal to zero and X1 is equal to a width of the second touch screen;
   the first electronic device is determined to be on the left of the second electronic device if X0 is equal to a width of the first touch screen and X1 is equal to zero;
   the first electronic device is determined to be below the second electronic device if Y0 is equal to zero and Y1 is equal to a height of the second touch screen; and
   the first electronic device is determined to be above the second electronic device if Y0 is equal to a height of the first touch screen and Y1 is equal to zero; and
   recording the position of the first electronic device relative to the second electronic device into a storage system of the first electronic device.

2. The method of claim 1, wherein the first electronic device is connected to the second electronic device via a wireless network.

3. The method of claim 1, wherein the arrival touch point and the arrival time that the object arrives at the second touch screen are detected by the second electronic device and are sent from the second electronic device to the first electronic device.

4. The method of claim 1, further comprises:
   sending the position of the first electronic device relative to the second electronic device to the second electronic device.

5. A first electronic device, comprising:
   a first touch screen;
   at least one processor; and
   a storage system storing a plurality of instructions, which when executed by the at least one processor, cause the at least one processor to:
   establish a communication connection between the first electronic device and a second electronic device comprising a second touch screen;
   prompt a user to slide an object from the first touch screen to the second touch screen, obtain a departure touch point and a departure time that the object departs from the first touch screen, and obtain an arrival touch point and an arrival time that the object arrives at the second touch screen;
   calculate a difference between the departure time and the arrival time, and determine the position of the first electronic device relative to the second electronic device according to the departure touch point and the arrival touch point in response that the difference between the departure time and the arrival time falls within a specified range, when coordinates of the departure touch point in a first coordinate system of the first electronic device are (X0, Y0), coordinates of the arrival touch point in a second coordinate system of the second electronic device are (X1, Y1), wherein an origin of the first coordinate system of the first electronic device is located at a top left corner of the first touch screen and an origin of the second coordinate system of the second electronic device is located at a top left corner of the second touch screen, the position of the first electronic device relative to the second electronic device is determined as follows:

the first electronic device is determined to be on the right of the second electronic device if X0 is equal to zero and X1 is equal to a width of the second touch screen;

the first electronic device is determined to be on the left of the second electronic device if X0 is equal to a width of the first touch screen and X1 is equal to zero;

the first electronic device is determined to be below the second electronic device if Y0 is equal to zero and Y1 is equal to a height of the second touch screen; and the first electronic device is determined to be above the second electronic device if Y0 is equal to a height of the first touch screen and Y1 is equal to zero; and record the position of the first electronic device relative to the second electronic device into the storage system.

6. The first electronic device of claim 5, wherein the first electronic device is connected to the second electronic device via a wireless network.

7. The first electronic device of claim 5, wherein the arrival touch point and the arrival time that the object arrives at the second touch screen are detected by the second electronic device and are sent from the second electronic device to the first electronic device.

8. The first electronic device of claim 5, wherein the storage system further stores instructions which cause the at least one processor to:

send the position of the first electronic device relative to the second electronic device to the second electronic device.

9. A non-transitory computer-readable storage medium storing a set of instructions, the set of instructions capable of being executed by a processor of a first electronic device comprising a first touch screen to implement a method for determining a position of the first electronic device relative to a second electronic device comprising a second touch screen, the method comprising:

establishing a communication connection between the first electronic device and the second electronic device;

prompting a user to slide an object from the first touch screen to the second touch screen, obtaining a departure touch point and a departure time that the object departs from the first touch screen, and obtaining an arrival touch point and an arrival time that the object arrives at the second touch screen;

calculating a difference between the departure time and the arrival time, and determining the position of the first electronic device relative to the second electronic device according to the departure touch point and the arrival touch point in response that the difference between the departure time and the arrival time falls within a specified range, when coordinates of the departure touch point in a first coordinate system of the first electronic device are (X0, Y0), coordinates of the arrival touch point in a second coordinate system of the second electronic device are (X1, Y1), wherein an origin of the first coordinate system of the first electronic device is located at a top left corner of the first touch screen and an origin of the second coordinate system of the second electronic device is located at a top left corner of the second touch screen, the position of the first electronic device relative to the second electronic device is determined as follows:

the first electronic device is determined to be on the right of the second electronic device if X0 is equal to zero and X1 is equal to a width of the second touch screen;

the first electronic device is determined to be on the left of the second electronic device if X0 is equal to a width of the first touch screen and X1 is equal to zero;

the first electronic device is determined to be below the second electronic device if Y0 is equal to zero and Y1 is equal to a height of the second touch screen; and the first electronic device is determined to be above the second electronic device if Y0 is equal to a height of the first touch screen and Y1 is equal to zero; and recording the position of the first electronic device relative to the second electronic device into a storage system of the first electronic device.

10. The storage medium of claim 9, wherein the first electronic device is connected to the second electronic device via a wireless network.

11. The storage medium of claim 9, wherein the arrival touch point and the arrival time that the object arrives at the second touch screen are detected by the second electronic device and are sent from the second electronic device to the first electronic device.

12. The storage medium of claim 9, wherein the method further comprises:

sending the position of the first electronic device relative to the second electronic device to the second electronic device.

\* \* \* \* \*